March 16, 1926. 1,577,206
G. S. DEMPSTER
AUTOMATIC THREAD CUTTING MACHINE ATTACHMENT
Filed June 6, 1923
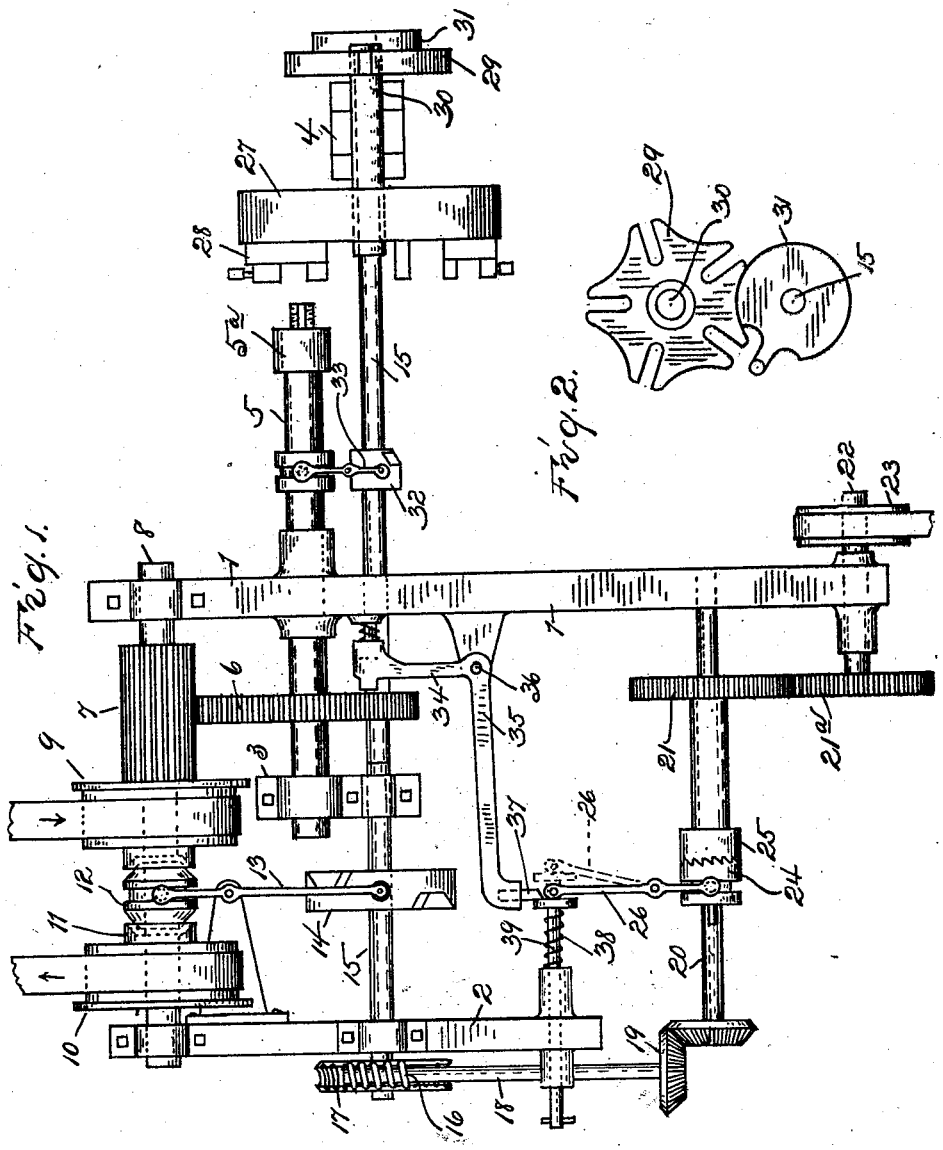
Inventor
George S. Dempster
By Whittemore, Hulbert Whittemore, & Belknap
Attorneys Patented Mar. 16, 1926.

1,577,206

UNITED STATES PATENT OFFICE.

GEORGE S. DEMPSTER, OF DETROIT, MICHIGAN, ASSIGNOR TO ROBERTS BRASS MANUFACTURING COMPANY, OF DETROIT, MICHIGAN, A CORPORATION OF MICHIGAN.

AUTOMATIC THREAD-CUTTING-MACHINE ATTACHMENT.

Application filed June 6, 1923. Serial No. 643,666.

*To all whom it may concern:*

Be it known that I, GEORGE S. DEMPSTER, a citizen of the United States of America, residing at Detroit, in the county of Wayne and State of Michigan, have invented certain new and useful Improvements in Automatic Thread-Cutting-Machine Attachments, of which the following is a specification, reference being had therein to the accompanying drawings.

This invention relates to thread cutting machines and particularly relates to machines providing for an automatic periodic reversal of the direction of drive to the thread cutting tool so as to alternately advance the latter to enter the work and retract the same.

It is the object of the invention to prevent damage either to the machine or work, in case retraction of the tool fails to take place at the proper time, by providing an automatic device which will respond to an abnormal advance of the tool holder by cutting off the drive to the endangered elements of the machine.

In the drawing:—

Figure 1 is a diagrammatic plan view of the improved machine;

Figure 2 is a view in elevation of an intermittently acting drive mechanism employed at one end of the machine.

In these views 1, 2, 3 and 4 designate frame elements and 5 is a shaft journaled in the elements 1 and 3 and carrying a holder 5ª for a tap or die (not shown). Said shaft is adapted to be driven through gears 6 and 7 from a shaft 8, the latter gear being relatively long so that it may continue in driving engagement with the gear 6 during the sliding travel of the shaft 5 requisite to operation of the tool upon the work and its withdrawal therefrom. 9 and 10 are reversely driven pulleys loosely mounted upon the shaft 8 and respectively carrying clutch elements 11 for alternative engagement by a sliding double friction clutch member 12 splined upon said shaft and actuable back and forth by an intermediately pivoted lever 13. Said lever is automatically controlled by a cam 14 fast upon a shaft 15 and of any suitable construction for shifting the clutch member 12 alternately into engagement with the two clutch members 11. The shaft 15 is driven through a worm 16 and worm wheel 17 from a shaft 18 which in turn is driven through bevel gears 19 from a shaft 20. The shaft 20 is adapted to be driven through gears 21 and 21ª from a shaft 22 carrying the drive pulley 23. The gear 21 is loose upon the shaft 20 and is rigidly connected to a clutch member 25 with which is engageable a clutch member 24 splined upon said shaft. An intermediately pivoted lever 26 controls the clutch 24, 25, and in the normal operation of the machine maintains said clutch closed, as shown in full lines in the drawing. 27 is a rotary work holder carrying a plurality of chucks 28 for engaging the work. Through a periodic angular advance of said work holder the chucks are adapted to consecutively register their work with the tool. The periodic drive means for the work holder comprises an ordinary Geneva wheel 29, on the shaft 30 of said work holder, and the usual drive element 31 for said wheel, the latter being fast upon the shaft 15. 32 is a cam upon the shaft 15 which acts through a lever 33 to advance and retract the shaft 5 to and from the position in which the tool initially engages the work. Thus, normally the cams 14 and 32 and the actuating element 31 are continuously driven. The clutch member 12 is periodically shifted back and forth to reverse the drive to the shaft 5, the lever 33 periodically oscillates to effect travel of the tool holder to and from its initial position and in the intervals when the tool holder is retracted, the work holder undergoes its indexing movement or angular advance.

The operation of the machine as so far described is defective in that at times the belt upon one of the drive pulleys 9 and 10 may slip or the clutch member 12 may at times fail to positively engage one of the clutch members 11, resulting in a failure of the shaft 5 to reverse its direction of rotation and effect withdrawal of the threading tool when the latter has engaged the work through the required distance.

Under such conditions, it is necessary to immediately cut off the drive to the machine and it is particularly essential to prevent the work holder from undergoing its periodic angular advance, or "indexing" movement, since such movement, while the tool is engaged with the work, means usually not only destruction of the work but serious damage to the machine. Thus, a failure of the tool to withdraw from the work frequently results in bending of the spindle 5, when the work-holder indexes, and the owner of the machine is put to a considerable expense for repairs, losing the production of the machine in the meantime. The mechanism 32, 33 for periodically advancing and retracting the tool holder to and from its initial position is also likely to be damaged in case engagement of the tool in or on the work prevents the work-holder from freely responding to said mechanism.

As a remedy for such occasional defective operation, the invention provides an automatic device which will respond to an abnormal advance of the tool-holder toward the work by cutting off the drive to the work-holder and to the mechanism for reciprocating the tool holder so that no damage will be done. Thus 34, 35 is a bell crank lever, pivoted at 36 upon the frame element 1 and having its arm 34 projecting into the path of advance of the gear 6. The other arm 35 of said bell crank carries a latch 37 whereby a tripping plunger 38 is normally held retracted. In case the tool holder 5ᵃ, with its shaft 5 and gear 6, advances abnormally toward the work, the bell crank 34, 35 is rocked sufficiently to withdraw the latch 37 from engagement with the plunger 38 whereupon a coiled spring 39 projects said plunger, throwing the lever 26 to the dash line position of the drawing and opening the clutch 24, 25. Thus, the drive to the cams 14 and 32 and to the Geneva wheel mechanism 29, 31 is cut off, the indexing movement of the work holder and the oscillation of the lever 33 are prevented, and resulting damage to the machine and work are avoided. Thus, the operator may give his entire attention to supplying the machine with new work and removing the finished pieces, without necessity of watching, at the same time, to see that the threading tool retracts at the proper time.

It is to be noted that the described automatic control device for the lever 26 does not interfere with ordinary use of said lever for manually stopping and starting the machine.

What I claim as my invention is:

1. In a thread cutting machine, the combination with a reciprocatory and rotative holder for a thread cutting tool, of means for rotatively driving said holder, a rotatable holder for work engageable by said tool, means for maintaining the holder stationary when the tool is advanced, and for periodically advancing the work holder rotatively upon disengagement of the tool from the work, a drive connection to said last named means, and means for cutting off said drive connection responsive to an abnormal advance of the tool holder toward the work holder.

2. In a thread cutting machine, the combination with a rotative tool holder, and a complementary work holder, one of said elements being reciprocatory toward the other, of means for rotatively driving the tool holder, means for periodically advancing the work holder rotatively, a drive connection to said last named means, and means for cutting off said drive connection responsive to an abnormal advance of the reciprocatory holder toward the other holder to prevent further advance of the work holder.

3. In a thread cutting machine, the combination with a reciprocatory and rotative holder for a thread cutting tool, of means for rotatively driving said holder, a rotatable holder for work engageable by said tool, means for periodically advancing the work holder rotatively, a drive connection to said means, a clutch controlling said drive connection, a pivotal control element for said clutch, and a member reciprocatory in unison with the tool holder engageable with said pivotal element through an abnormal advance of the tool holder toward the work holder for opening said clutch.

4. In a thread cutting machine, the combination with a reciprocatory and rotative holder for a thread cutting tool, of means for rotatively driving said holder, a rotatable holder for work engageable by said tool, means for periodically advancing the work holder rotatively, a drive connection to said means, a clutch controlling said drive connection, a pivotal control element for said clutch, and a member reciprocatory in unison with the tool holder engageable with said pivotal element through an abnormal advance of the tool holder toward the work holder for opening said clutch, and means for manually controlling said clutch independently of said pivotal member.

5. In a thread cutting machine, the combination with a rotative holder for a thread cutting tool, of a complementary rotary work holder, one of said holders being reciprocatory to and from the other, means for rotatively driving said tool holder, means for periodically advancing the work holder rotatively, a drive connection to the last named means, a clutch controlling said drive connection, automatic means for opening said clutch responsive to an abnormal approach of the reciprocatory holder toward the complementary holder, and independent means for manually controlling said clutch.

6. In a thread cutting machine, the combination with a rotative holder for a thread cutting tool, and a complementary work holder, one of said holders being reciprocatory toward the other, of means for rotatively driving the tool holder, means for periodically advancing the work holder rotatively, a drive connection to the last named means, a clutch controlling said drive connection, a lever affording a manual control of said clutch, a spring for shifting said lever to open the clutch, and means normally restraining said spring from acting upon the latter releasable through an abnormal advance of the reciprocatory holder toward a complementary holder.

7. In a thread cutting machine, the combination with a reciprocatory and rotative holder for a thread cutting tool, of a complementary work holder, means for rotatively driving the tool holder, means for periodically advancing the work holder rotatively, a bell crank lever intermediately pivoted, a member reciprocatory in unison with the tool holder engageable with one arm of said lever upon an abnormal advance of the tool holder toward the work holder, the clutch controlling the rotative advance of the work holder, a lever manually actuable to control said clutch, and means for urging said clutch to open position normally restrained by the other arm of said bell crank lever and releasable by the latter upon abnormal advance of the tool holder.

8. In a thread cutting machine, the combination with a holder for a thread cutting tool, and a complementary work holder, one of said holders being reciprocatory toward the other, of means for rotating one of said holders to engage the tool with the work, mechanism for periodically relatively shifting the two holders transversely to the axis of the tool, a drive connection to said mechanism, and means for cutting off said drive connection responsive to a failure of the reciprocatory tool to retract from the other.

9. In a thread cutting machine, the combination with a holder for a thread cutting tool, and a complementary work holder, one of said holders being reciprocatory toward the other, of means for rotating one of said holders to engage the tool with the work, mechanism for periodically relatively shifting the two holders transversely to the axis of the tool, a drive connection to said mechanism, and means for cutting off the drive to said mechanism responsive to an abnormal advance of the reciprocatory holder toward the complementary holder.

10. In a thread cutting machine, the combination with a reciprocatory and rotative holder for a thread cutting tool, of means for rotatively driving said holder, a holder for work engageable by said tool, and automatic means for cutting off the drive to the work holder responsive to an abnormal advance thereof toward the work holder.

11. In a thread cutting machine, a rotative holder for the tool, means for advancing and withdrawing the tool, a holder for the work, means for holding the work holder immovable when the tool is being advanced, means for rotating the work holder transversely to the tool, and automatic emergency means for preventing operation of the work holder rotating means upon an abnormal advance of the tool.

In testimony whereof I affix my signature.
GEORGE S. DEMPSTER.